United States Patent [19]

Lund

[11] 4,328,713
[45] May 11, 1982

[54] CONTROLLING TRANSLATION

[75] Inventor: Harold Lund, Reading, Mass.

[73] Assignee: Eikonix Corporation, Bedford, Mass.

[21] Appl. No.: 126,406

[22] Filed: Mar. 3, 1980

[51] Int. Cl.³ .................... G05G 11/00; G02B 21/24
[52] U.S. Cl. .................................. 74/479; 33/1 M;
74/89.14; 74/384; 74/425; 248/178; 248/287;
248/661; 350/82; 350/84
[58] Field of Search ............. 74/384, 425, 479, 89.14;
188/67; 350/82, 84, 85; 33/1 M; 248/178, 287,
661; 269/71

[56] References Cited

U.S. PATENT DOCUMENTS

| | | | |
|---|---|---|---|
| 2,121,457 | 6/1938 | Vanbergen | 74/384 X |
| 2,259,811 | 10/1941 | Fregeau | 74/89.14 |
| 2,624,252 | 1/1953 | Judd | 350/85 X |
| 2,723,776 | 11/1955 | Jacobson | 188/67 |
| 2,813,434 | 11/1957 | Stuebs | 74/384 X |
| 2,951,560 | 9/1960 | Smellie | 188/67 X |
| 3,241,243 | 3/1966 | Speer | 33/1 M X |
| 3,475,075 | 10/1969 | Stone, Jr. | 350/85 |
| 3,606,693 | 9/1971 | Grimes et al. | 350/135 X |
| 3,774,311 | 11/1973 | Stemple | 33/1 M X |

FOREIGN PATENT DOCUMENTS 1265620 7/1965 Fed. Rep. of Germany ........ 350/85

Primary Examiner—Allan D. Herrmann
Attorney, Agent, or Firm—Charles Hieken

[57] ABSTRACT

A completely mechanically operated microscope bridge includes rapid rough positioning, fine positioning, coarse focusing and fine focusing with an automatic locking system locking the microscope at the position set by the operator whether power is on or off. In the focusing mechanism the drive slips when the microscope hits the viewing platen or if the microscope rhomboid is caught under the cross beam or overhanging arm on the light table while being raised. A brake prevents the microscope from being manually pushed into the viewing platen. In the x and y plane movement mechanisms torque limiting clutches prevent damage to the drive mechanisms, and a slip clutch allows turning of a positioning knob without driving when the bridge reaches the end of travel.

8 Claims, 7 Drawing Figures

CONTROLLING TRANSLATION

BACKGROUND OF THE INVENTION

The present invention relates in general to controlling translation and more particularly concerns a rigid compact and completely mechanically operated microscope bridge that provides an operator with rapid rough positioning, fine positioning, coarse focusing and fine focusing, includes an automatic locking system that locks the microscope at the position set by the operator whether power is on or off and includes safety features that allow the drive to slip when the microscope hits the viewing platen or the microscope rhomboid is caught under a cross beam or overhanging arm on an associated light table while being raised. Other safety features include a brake that prevents the microscope from being manually pushed into the viewing platen and torque limiting clutches for preventing damage to the drive mechanisms.

A typical prior art bridge is described in U.S. Pat. No. 3,606,693 granted Sept. 21, 1971, on a FILM VIEWING MEANS of Grimes and Kasdorf. That patent describes a master overhead carriage system that includes a quick release coupling between an X travel unit and a Y travel unit, and a Z travel instrument carrying unit on the X travel unit having a rotary instrument supporting ring. The patent discloses coarse and fine focusing adjustments in the Z travel using a gravity feed for preventing feeding of the instrument into the viewing stage while permitting rapid instrument elevation with a manually operated clamp or lock for adjusting the instrument around the X axis. An electrical clutching arrangement automatically couples X and Y fine feed means and includes an electrical decoupling for permitting rapid instrument positioning along the X and Y axes.

It is an important object of this invention to provide improved apparatus and techniques for controlling translation.

It is another object of the invention to achieve the preceding object while effecting the translation rapidly, safely and precisely.

It is still another object of the invention to achieve one or more of the preceding objects while automatically locking the apparatus to maintain a selected position following actuation of the apparatus to effect translation and establish the selected position.

It is a further object of the invention to achieve one or more of the preceding objects with reliable apparatus that is relatively easy and inexpensive to fabricate taking into consideration the precision, speed and safety with which translation is controlled.

It is still a further object of the invention to achieve one or more of the preceding objects with apparatus easily operable by relatively unskilled personnel to effect controlled translation for rapidly and precisely establishing a desired position of a device, such as a microscope, carried by the apparatus.

SUMMARY OF THE INVENTION

According to the invention, there is carrier means for supporting a device to be positioned. There is first support means for supporting the carrier means relatively positionable along a usually generally vertical first axis including a cable fed from a spring-loaded reel that comprises means for counterbalancing the supported device and includes first and second one-way clutch means for ordinarily comprising drive means for effecting first direction usually upward and second direction usually downward movement, respectively, of the supported device while slipping when the supported device encounters obstruction and driving force continues to be applied. The first support means is carried by second support means that rides on a second support guide means that is generally usually horizontal and perpendicular to said first guide means. The second support means rides on third guide means that is generally usually horizontal and generally perpendicular to said first and second guide means, thereby allowing translation of the supported device in three mutually perpendicular directions. Preferably, the means for driving the second and third support means comprises a cable riding over pulley means driven by gear means typically including spur gear means functioning as a transmission, worm gear means for driving the spur gear means, means including clutch means for releasably coupling knob means to the worm gear means for selectively positioning the support means, and slew lever means for interrupting the coupling between the worm gear means and the pulleys for allowing rapid translation of the support means to effect coarse adjustment. The apparatus preferably includes hex drive means for releasably coupling driving power to vertically translate the supported device.

Numerous other features, objects and advantages of the invention will become apparent from the following specification when read in connection with the accompanying drawing in which:

DETAILED DESCRIPTION OF PREFERRED EMBODIMENTS

Figure 1:
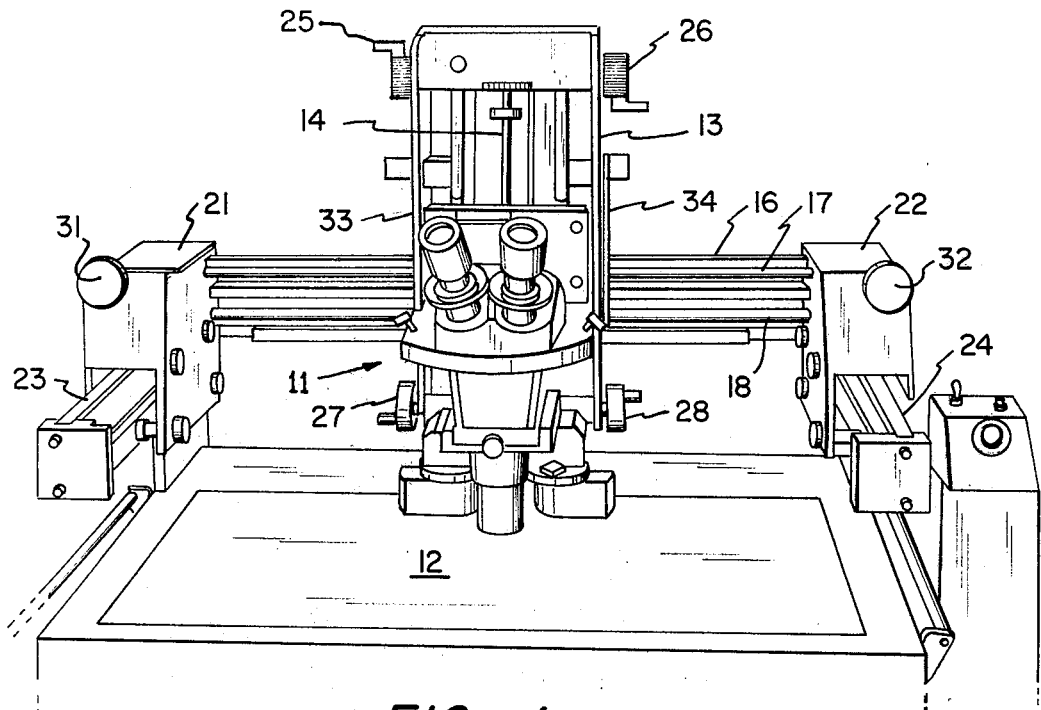
FIG. 1 is a perspective view of a system according to the invention for translating and positioning a stereo microscope above a viewing platen.

With reference now to the drawing and more particularly FIG. 1 thereof, there is shown a perspective view of a system according to the invention comprising a light table in which the invention translates and positions a stereo microscope 11 above a viewing platen 12 rapidly, precisely and safely. A vertical base 13 comprises first support means for carrying microscope 11 for relative displacement along vertical rails 100A embraced by pulleys 100 (FIG. 5) comprising first guide means. The vertical base 13 rides on cross member 16 comprising second support means and along pulley-ridden rails (not shown in FIG. 1) and rod 18 comprising second guide means generally horizontal and perpendicular to rod 14. The second support means also includes left and right bases 21 and 22 that ride on left and right rails 23 and 24 comprising third support means generally horizontal and perpendicular to rods 14 and 18. Coarse knobs 25 and 26 typically translate microscope 11 0.100 inch per revolution vertically while fine focus knobs 27 and 28 typically translate microscope 11 vertically 0.05 inch per revolution.

Rotating Y plane knob 31 clockwise and counterclockwise moves the first and second support means and microscope 11 forward and backward, respectively. Rotating X plane knob 32 clockwise and counterclockwise moves the first support means and microscope 11 to the right and left respectively. Rapid rough positioning is achieved by pulling slew release levers 33 and 34 forward to actuate slew row 17 attached to main slew lever 17A that pivots about shaft 17B and decouple the transmission from knobs 31 and 32, pushing or pulling the first and second support means to the desired position in the Y direction and sliding the first support means left or right to the desired X position. Releasing slew levers 33 and 34 locks the assembly at the selected rough position.

Figure 2:
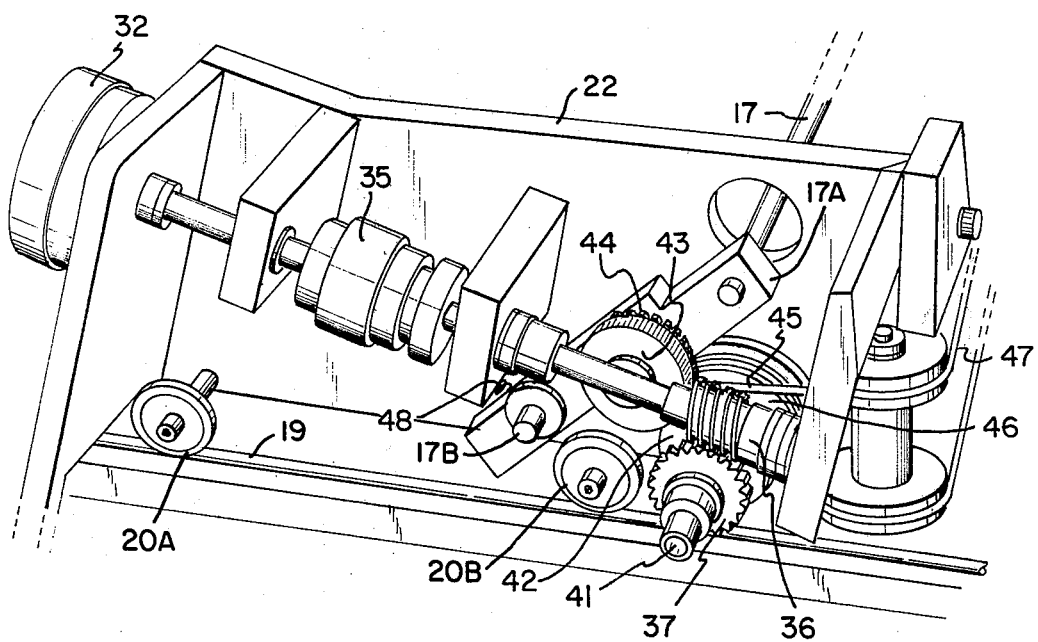
FIG. 2 is a perspective view of a portion of the invention illustrating details of the mechanism for controlling translation in the horizontal plane.

Referring to FIG. 2, there is shown a perspective view of that portion of the structure associated with establishing the X position, essentially the same mechanism being used to establish the Y position. Like reference symbols identify corresponding elements throughout the drawing. Means including a clutch 35 couple knob 32 to worm gear 36 which drives spur gear 37 attached to shaft 41 to which driving gear 42 is attached for normally driving driven gear 43 that causes driving gear 44 to rotate and drive gear 45 on cable drum 46 when spring 48 normally keeps gear 43 meshed with gear 42 so that rotation of knob 32 rotates drum 46 and causes cable 47 attached to base 13 and passing over a pulley (not shown). When slew levers 33 and 34 are pulled forward, slew release shaft 17 attached to main slew lever 17A that pivots about shaft 17B follows forward to disengage gears 42 and 43 and 44 and 45, thereby allowing drum 46 to rotate freely as base 13 is moved to the left or right. When slew levers 33 and 34 are released, spring 48 restores them and slew release shaft to their stable rearward position with these gears engaged so that knob 32 may then be used to establish the fine X position of the microscope 11. Gears 43 and 44 are on stub shaft 40. If base 13 is at the extreme left or right, continuing to rotate knob 32 in a direction urging base 13 against the side member it has reached results in clutch 35 slipping to prevent the apparatus from being damaged. Pulleys 20A and 20B move on rail 19 for Y positioning.

Figure 3:
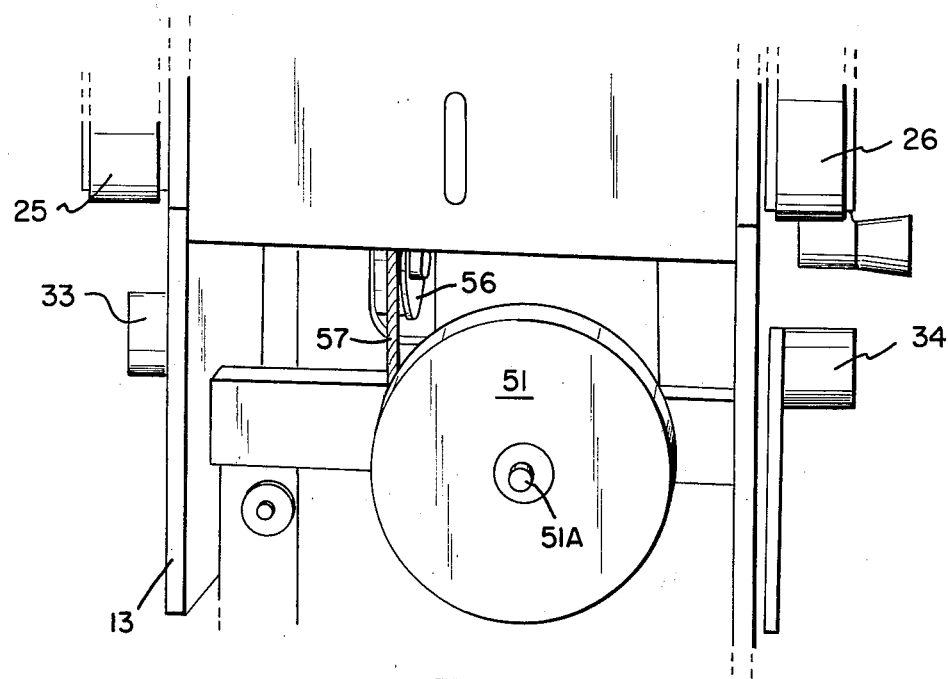
FIG. 3 is a perspective view of a portion of the mechanism for controlling vertical translation.

Referring to FIG. 3, there is shown a perspective view of a portion of base 13 showing spring-loaded reel 51 on shaft 51A which is attached to a Rohlix actuator 50 (FIG. 6) and acts as a counterbalance as microscope 11 moves up and down.

Figure 4:
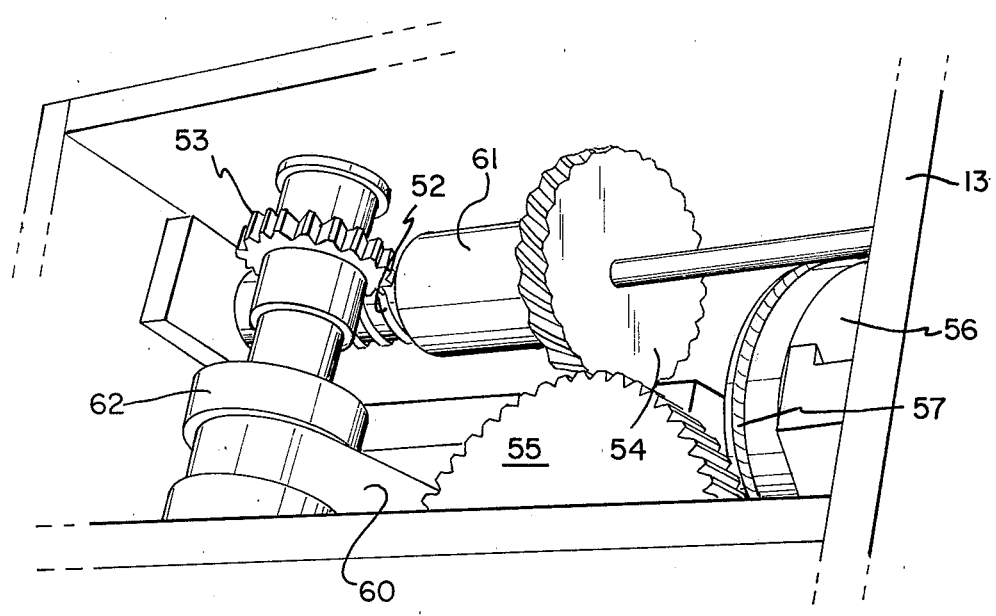
FIG. 4 is also a perspective view of a portion of the mechanism for controlling vertical translation illustrating the location of the spring-loaded reel.
Figure 6:
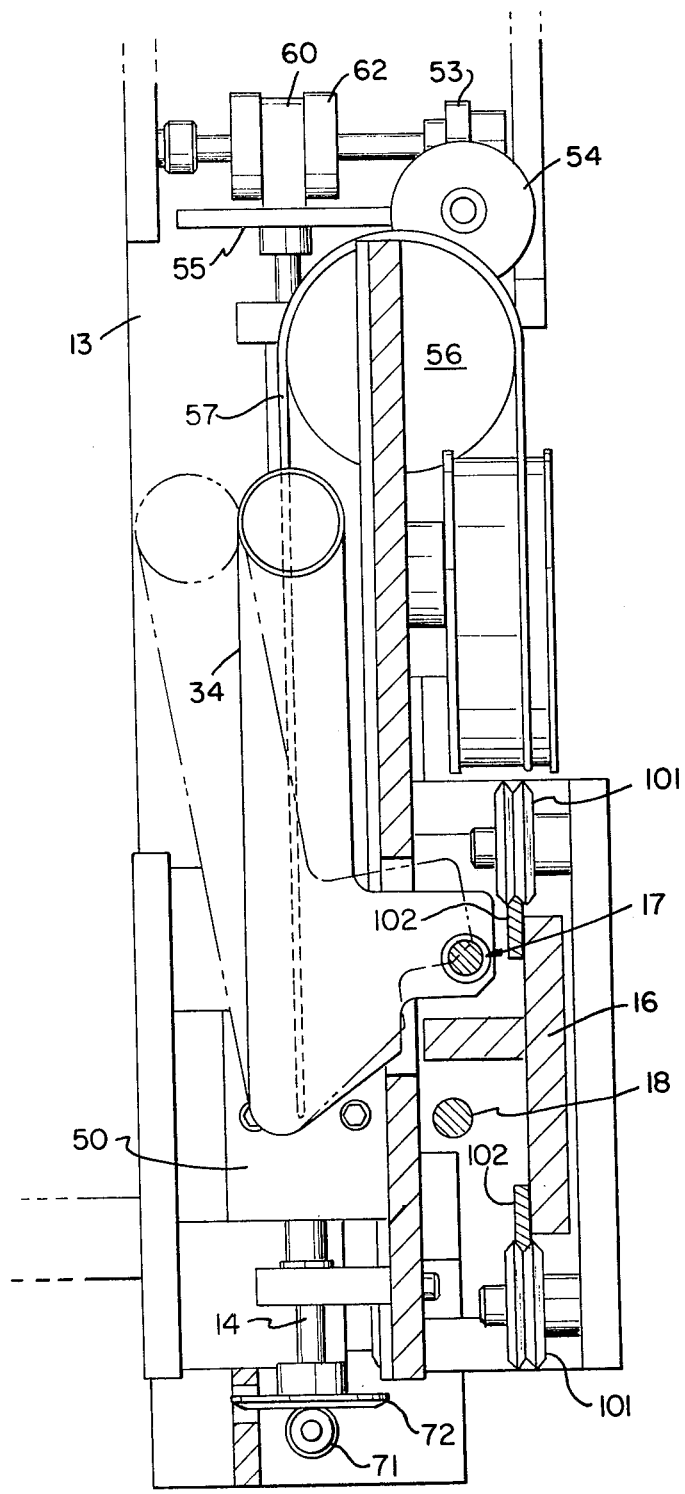
FIG. 6 is an elevation view partially in section and diagrammatic of the support means for raising and lowering the supported device.

Referring to FIG. 4, there is shown a perspective view of portions of the structure for effecting coarse adjustment of the vertical position of base 13 and microscope 11. Rotating knobs 25 and 26 (FIG. 1) rotate worm gear 52 and vertical helical gear 54 which meshes with helical gear 55 that causes an attached shaft associated with a Rohlix actuator 50 to rotate and thereby raise and lower microscope 11. Cable 57 rides over pulley 56 and is attached to the Rohlix actuator 50 as best seen in FIG. 6. Lower knobs 27 and 28 provide for fine vertical adjustment.

Figure 5:
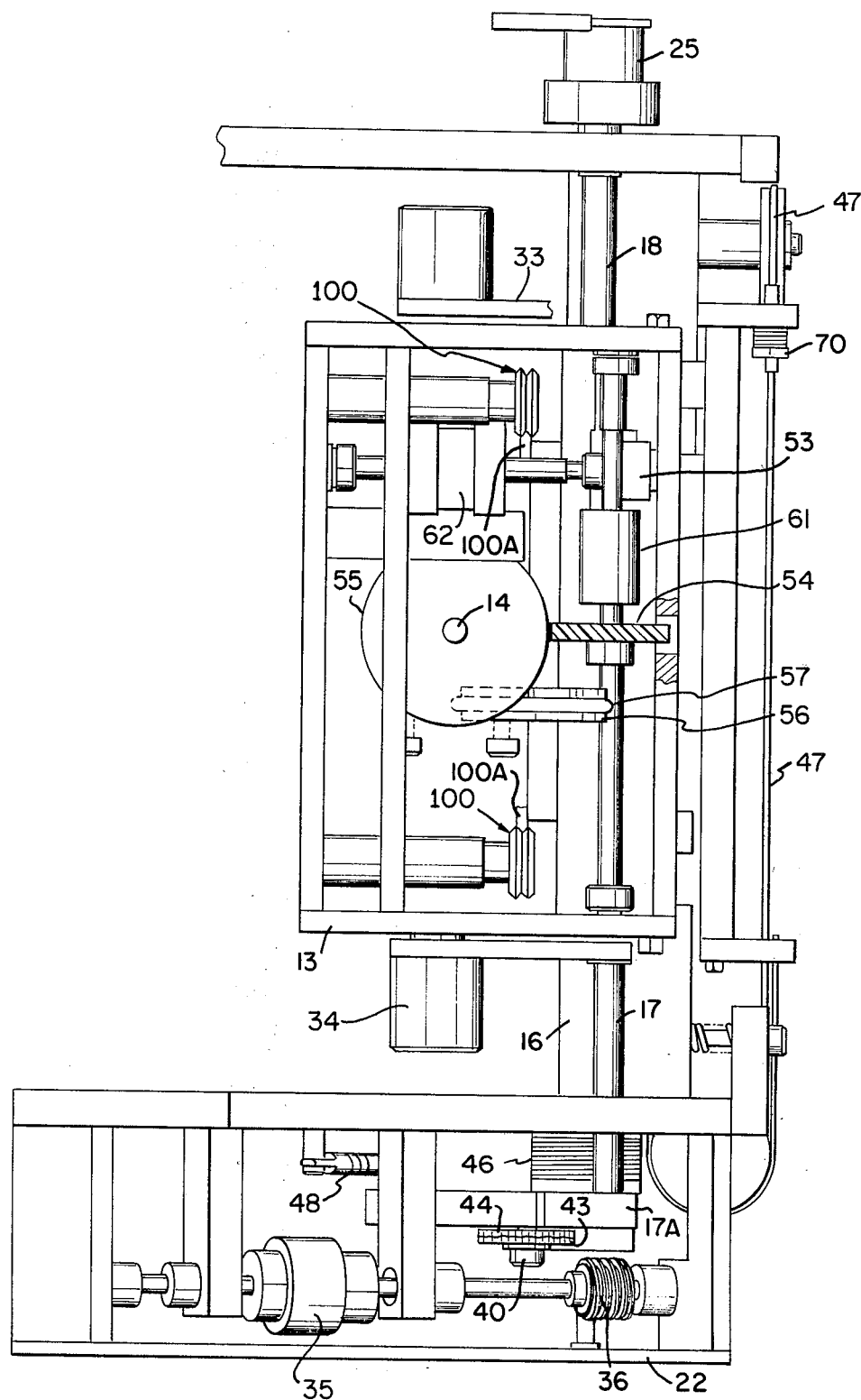
FIG. 5 is a plan view partially in section and schematic of major portions of the positioning apparatus according to the invention.

Referring to FIG. 5, there is shown a top view of some of the apparatus partially diagrammatic and partially in section helpful in understanding some structural details of the invention. In addition to elements already identified above, FIG. 5 shows one-way roller clutches 61 and 62. A constant force spring 60 (FIG. 4) is wrapped around one-way roller clutch 62 which is secured to base 13. When base 13 is pushed downward, one-way clutch 62 engages to brake the base because worm gear 52 prevents spur gear 53 from rotating. When base 13 is moved upward, one-way clutch 62 releases so that the microscope assembly may be easily raised but advanced downward only by rotating coarse focus knobs 25 and 26 or fine focus knobs 27 and 28. One-way clutch 61 disengages when knobs 25 and 26 are used to raise the assembly by raising constant force spring 60 as worm gear 52 rotates to drive spur gear 53. When knobs 25 and 26 are rotated in the opposite direction to lower the microscope assembly, one-way clutch 61 engages to rotate gear 54 that drives gear 55 and rotates shaft 14. This arrangement thus provides a means for allowing easy and rapid raising of the microscope assembly while preventing rapid downward movement that might accidently cause damage. Cable 47 is attached to base 13 by cable attachment nut 70.

Figure 7:
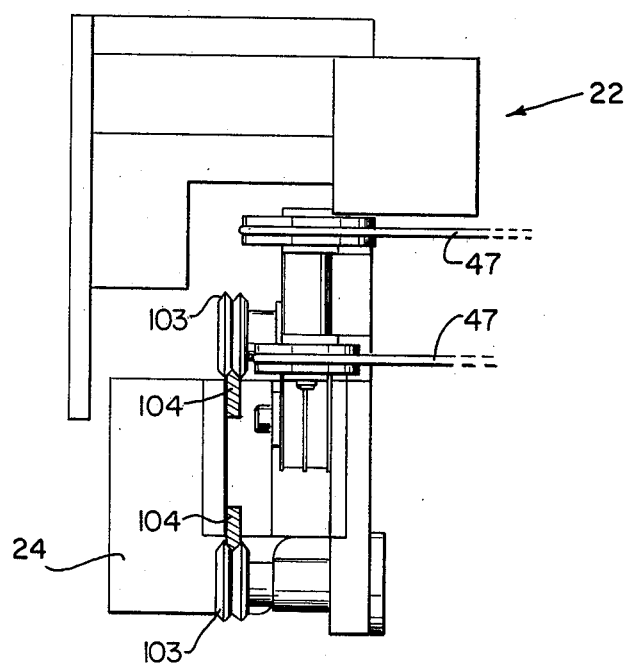
FIG. 7 illustrating a detail of the means for providing front and back guidance.

Referring to FIG. 6, there is shown an elevation view partially diagrammatic and partially in section of base 13 helpful in understanding certain structural features. This view shows beveled gear 71 attached to the shaft driven by fine focus knobs 27 and 28 and mating with beveled gear 72 that drives shaft 14 at the bottom to provide fine focusing, shaft 14 being driven at the top by helical gear 55. A pair of rotatable pulleys or V-wheels 101 are mounted on base 13 and ride on rails 102 to allow left-right movement of the assembly. Referring to FIG. 7, there is shown a portion of left base 23 that includes a pair of pulleys or V-wheels 103 that engage a pair of rails 104 that allow for front and back movement of the assembly, it being understood that base 24 is similarly arranged.

There has been described novel apparatus and techniques for effecting controlled translation of a device mechanically and precisely establishing a desired position. Coarse changes may be effected rapidly and easily. The invention includes a number of safety features to help prevent damage. The structure is rugged, reliable and relatively easy and inexpensive to fabricate and largely uses available components. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:
1. Translation controlling apparatus comprising,
first support means for supporting a device to be positioned relative to a predetermined reference plane,
means including first guide means for supporting said device on said first support means for relative displacement along a first axis and including means for providing significantly more resistance to move- ment of said device toward than from said reference plane, said means for providing increased resistance comprising one-way clutch means in a means for moving said device toward and from said reference plane, including, a worm gear, a spur gear meshed with said worm gear, means for coupling said first support means to the gear assembly comprising said worm gear and said spur gear including said one-way clutch means for converting the rotation of said spur gear to translation of said first support means with said one-way clutch means engaging in response to a force being applied to said first support means directed toward said reference plane and releasing in response to a force being applied on said support means away from said reference plane.

2. Translation controlling apparatus in accordance with claim 1 and further comprising, second support means for supporting said first support means, second guide means for allowing relative movement of said second support means along a second axis generally perpendicular to said first axis, third support means for supporting said second support means and including third guide means for allowing relative movement between said second and third support means along a third axis generally perpendicular to said first and second axes, first and second drive means releasably coupled to said second and third support means for selectively moving said second and third support means along said second and third axes, respectively, and means for selectively decoupling said first and second drive means for allowing rapid translation of said device along directions generally parallel to said second and third axes.

3. Translation controlling apparatus in accordance with claim 2 and further comprising first and second clutch means coupled to said first and second drive means for slipping when said second and third support means have reached a predetermined travel limit.

4. Translation controlling apparatus in accordance with claim 2, wherein said first and second drive means each comprise rotatable drum means for engagement with cable means, drive cable means wrapped about said drum means connected to a respective support means for translating the respective support means upon rotation of said drum means, first and second spur gear means, worm gear means meshing with said first spur gear means for driving the latter, said second spur gear means being connected to said drum means for selective rotation thereof, knob means for fine positioning an associated support means, means including clutch means for coupling said knob means to said worm gear means, movable spur gear means normally engaged with said first and second drive spur means and comprising said means for selectively decoupling, said means for selectively decoupling further comprising means for pivotally supporting said movable spur gear means, spring means for normally urging said movable gear means into engagement with said first and second spur gear means, and rod means engaging said means for pivotally supporting for transmitting a force to said means for pivotally coupling for selectively disengaging said movable spur gear means from said first and second spur gear means.

5. Translation controlling apparatus in accordance with claim 1 wherein said means for coupling comprises, a flexible member secured at one end to said first support means, means for wrapping the other end of said flexible means about the axis of said spur gear, and means including said one-way clutch means for coupling the rotation of said spur gear to said means for wrapping with said one-way clutch means engaging in response to a force being applied to said first support means directed toward said reference plane and releasing in response to a force being applied on said support means away from said reference plane.

6. Translation controlling apparatus in accordance with claim 5 wherein said flexible means is a flexible band spring.

7. Translation controlling apparatus in accordance with claim 6 and further comprising, a Rohlix actuator for controlling the relative displacement along said first axis, a first shaft along said first axis upon which said Rohlix actuator rides, means including a first gear attached to said first shaft for rotating said first shaft and displacing said Rohlix actuator therealong and a second gear meshed with said first gear and rotatable about the axis of said worm gear, and means including a second one-way clutch means for coupling said worm gear to said second gear which engages when said worm gear rotates in a direction causing said first and second gears to rotate said first shaft to move said Rohlix actuator toward said reference plane and disengages when rotated in the opposite direction.

8. Translation controlling apparatus in accordance with claim 7 and further comprising, second support means for supporting said first support means, second guide means for allowing relative movement of said second support means along a second axis generally perpendicular to said first axis, third support means for supporting said second support means and including third guide means for allowing relative movement between said second and third support means along a third axis generally perpendicular to said first and second axes, first and second drive means releasably coupled to said second and third support means for selectively moving said second and third support means along said second and third axes respectively, and means for selectively decoupling said first and second drive means for allowing rapid translation of said device along directions generally parallel to said second and third axes respectively, wherein said first and second drive means each comprise rotatable drum means for engagement with cable means, drive cable means wrapped about said drum means connected to a respective support means for translating the respective support means upon rotation of said drum means, first and second spur gear means, worm gear means meshing with said first spur gear means for driving the latter, said second spur gear means being connected to said drum means for selective rotation thereof, knob means for fine positioning an associated support means, means including clutch means for coupling said knob means to said worm gear means, movable spur gear means normally engaged with said first and second drive spur means and comprising said means for selectively decoupling, said means for selectively decoupling further comprising means for pivotally supporting said movable spur gear means, spring means for normally urging said movable gear means into engagement with said first and second spur gear means, and rod means engaging said means for pivotally supporting for transmitting a force to said means for pivotally coupling for selectively disengaging said movable spur gear means from said first and second spur gear means.

* * * * *